(12) United States Patent
Nonogaki et al.

(10) Patent No.: US 9,961,889 B2
(45) Date of Patent: May 8, 2018

(54) FISHING REEL

(71) Applicant: Globeride, Inc., Tokyo (JP)

(72) Inventors: Motohiro Nonogaki, Tokyo (JP); Hideki Jo, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days. days.

(21) Appl. No.: 15/441,879

(22) Filed: Feb. 24, 2017

(65) Prior Publication Data

US 2017/0280696 A1    Oct. 5, 2017

(30) Foreign Application Priority Data

Mar. 31, 2016    (JP) ................. 2016-071904

(51) Int. Cl.
| | | |
|---|---|---|
| *A01K 89/01* | (2006.01) | |
| *A01K 89/017* | (2006.01) | |
| *A01K 89/015* | (2006.01) | |
| *A01K 89/033* | (2006.01) | |
| *F16H 1/22* | (2006.01) | |

(52) U.S. Cl.
CPC ........ *A01K 89/017* (2013.01); *A01K 89/0192* (2015.05); *A01K 89/01902* (2015.05); *A01K 89/057* (2015.05); *F16H 1/22* (2013.01)

(58) Field of Classification Search
CPC .............. A01K 89/015; A01K 89/0192; A01K 89/01921; A01K 89/01924
See application file for complete search history.

(56) References Cited

U.S. PATENT DOCUMENTS 3,028,717 A * 4/1962 West ................. A01D 34/67
56/10.5
4,394,991 A * 7/1983 Noda ................. A01K 89/015
242/261
4,474,339 A * 10/1984 Sato ................. A01K 89/015
188/82.3

(Continued)

FOREIGN PATENT DOCUMENTS

JP    09065804 A * 3/1997 ........... A01K 89/015
JP    2559947        1/1998
(Continued)

OTHER PUBLICATIONS

Non-final Office Action Taiwanese Patent Application No. 106107306 dated Jan. 19, 2018 with English translation.

*Primary Examiner* — Emmanuel M Marcelo
(74) *Attorney, Agent, or Firm* — Pillsbury Winthrop Shaw Pittman, LLP

(57) ABSTRACT

One object is to provide a fishing reel in which under a high load, a smooth rotation performance of the handle shaft and the pinion gear shaft can be maintained and the accuracy of the position to support the handle shaft and the pinion gear shaft can be ensured. The fishing reel of the present invention includes: a handle shaft rotatably provided on a frame; a drive gear provided on the handle shaft; a spool configured to be rotationally driven via a pinion gear meshing with the drive gear; a side plate fixed on the frame; and a support unit separate from the side plate, wherein the support unit includes a handle shaft support that supports a handle shaft, and a pinion gear shaft support that supports a pinion gear shaft of the pinion gear, and the support unit is removably fixed on the frame.

7 Claims, 13 Drawing Sheets

(56) References Cited

U.S. PATENT DOCUMENTS

| | | | | |
|---|---|---|---|---|
| 5,427,323 | A * | 6/1995 | Kaneko | A01K 91/20 242/223 |
| 5,749,533 | A * | 5/1998 | Daniels | A01K 89/01555 188/268 |
| 5,775,614 | A * | 7/1998 | Yamaguchi | A01K 89/015 242/261 |
| 5,829,701 | A * | 11/1998 | Murayama | A01K 89/015 242/310 |
| 6,045,076 | A * | 4/2000 | Daniels | A01K 89/01555 188/268 |
| 6,095,444 | A * | 8/2000 | Miyazaki | A01K 89/015 242/310 |
| 6,199,782 | B1 * | 3/2001 | Oishi | A01K 89/015 242/290 |
| 6,276,532 | B1 * | 8/2001 | Sperry | B29C 65/342 206/522 |
| 6,569,283 | B1 * | 5/2003 | Sperry | B29C 65/342 156/580 |
| 7,341,215 | B2 * | 3/2008 | Martin | A01K 89/015 242/249 |
| 2001/0038052 | A1 * | 11/2001 | Oishi | A01K 89/0117 242/255 |
| 2005/0282665 | A1 * | 12/2005 | Tarng | A63B 59/20 473/465 |
| 2012/0000783 | A1 * | 1/2012 | Suda | C25D 11/04 205/50 |
| 2012/0103743 | A1 * | 5/2012 | Hong | F16D 41/063 192/45.1 |
| 2014/0291430 | A1 | 10/2014 | Takamatsu et al. | |
| 2015/0342167 | A1 | 12/2015 | Takechi | |
| 2015/0377179 | A1 * | 12/2015 | Nayar | F02G 1/053 60/517 |
| 2017/0107401 | A1 * | 4/2017 | Fish | C09D 183/16 |

FOREIGN PATENT DOCUMENTS

| | | | | |
|---|---|---|---|---|
| JP | 2000245317 A | * | 9/2000 | A01K 89/015 |
| TW | 201400011 A | | 1/2014 | |
| TW | 201438571 A | | 10/2014 | |
| TW | 201442624 A | | 11/2014 | |
| TW | 201545645 A | | 12/2015 | |

* cited by examiner

FISHING REEL

CROSS-REFERENCE TO RELATED APPLICATIONS

This application is based on and claims the benefit of priority from Japanese Patent Application Serial No. 2016-071904 (filed on Mar. 31, 2016), the contents of which are hereby incorporated by reference in their entirety.

TECHNICAL FIELD

The invention relates to a fishing reel.

BACKGROUND

There have been known double bearing fishing reels. Conventional double bearing fishing reels include left and right frames of a reel body and left and right side plates mounted on the left and right frames. Between the left and right side plates, a spool is supported so as to be rotatable. In most cases, the left and right side plates are made of a metal or a synthetic resin for weight reduction.

On one of the left and right frames, a handle shaft is provided so as to be rotatable.

The handle shaft is connected frictionally with a drive gear via a drag mechanism. The drive gear meshes with a pinion gear connected to the spool.

In such a fishing reel, when the handle mounted on the handle shaft is rotated, the spool is rotated via the drive gear and the pinion gear, and a fishing line is wound around the spool.

One example of double bearing fishing reel is disclosed in Japanese Utility Model Registration Publication No. 2559947. In this fishing reel, a support unit is fixed on a side plate. The support unit includes a handle shaft support that supports a handle shaft, and a pinion gear shaft support that supports a spool shaft (a pinion gear shaft). The handle shaft support and the pinion gear shaft support are integrated together.

In this fishing reel, the handle shaft support and the pinion gear shaft support constitutes one support, and therefore, it is possible to restrain deformation between the handle shaft support and the pinion gear shaft support under a high load.

However, in Japanese Utility Model Registration Publication No. 2559947, the support unit is fixed on the side plate. Therefore, when the handle is operated to wind the fishing line under a high load, a force imparted to the support unit may be transmitted to the side plate and cause deformation of the side plate. If the side plate is deformed, a relative displacement may occur between the frame and the support unit, reducing the rotation performance of the handle shaft and the pinion gear shaft.

The accuracy of the position to support the handle shaft and the pinion gear shaft is associated with the part accuracy of the side plate and the accuracy of mounting the support unit onto the side plate. Therefore, the conventional configuration is unfavorable for managing the accuracy of the position to support the handle shaft and the pinion gear shaft.

SUMMARY

The present invention addresses the above problems, and one object thereof is to provide a fishing reel in which under a high load, a smooth rotation performance of the handle shaft and the pinion gear shaft can be maintained and the accuracy of the position to support the handle shaft and the pinion gear shaft can be ensured.

The fishing reel of the present invention for solving the above problems comprises: a handle shaft rotatably provided on one of left and right frames of a reel body; a drive gear provided on the handle shaft a spool configured to be rotationally driven via a pinion gear meshing with the drive gear; a side plate fixed on the one of the left and right frames; and a support unit separate from the side plate, wherein the support unit includes a handle shaft support that supports a handle shaft, and a pinion gear shaft support that supports a pinion gear shaft of the pinion gear, and the support unit is removably fixed on the one of the left and right frames. The term "pinion gear shaft" includes a spool shaft that supports a spool and extends from the spool in an axial direction to support the pinion gear, and a spindle separate from the spool shaft or a tubular portion that is integrally projected in an axial direction of the pinion gear.

In this fishing reel, the handle shaft and the pinion gear shaft that are subjected to a load during winding operation can be supported directly on the frame via the support unit separate from the side plate. Therefore, the strength of supporting the handle shaft and the pinion gear shaft can be increased, and there is less possibility of relative displacement between the frame and the support unit.

In the above fishing reel, at least part of the support unit is preferably exposed through the side plate. This arrangement may increase the degree of freedom in design of the support unit and the side plate. Since at least part of the support unit is exposed, the drag mechanism can be provided on the handle shaft so as to facilitate heat release from the support unit.

In the above fishing reel, the entirety of the support unit is preferably covered by the side plate. This arrangement may increase the degree of freedom in design of the side plate. Also, the waterproofness of the support unit can be increased.

In the above fishing reel, the support unit is preferably capable of housing a plurality of brake plates included in a drag mechanism for frictional connection between the handle shaft and the drive gear rotatably provided on the handle shaft. This arrangement makes it possible that the portions that may have a relatively high temperature during winding operation of the handle are positioned together in the support unit.

In the above fishing reel, it is preferable that the support unit is made of a metal and the side plate is made of a synthetic resin. With this arrangement, it may be possible to increase the strength of the portions that are subjected to a load during winding operation, and reduce the weight.

In the above fishing reel, it is preferable that the reel body includes an electric motor configured to rotationally drive the spool, and the side plate has an opening portion for releasing heat of the electric motor. Thus, cooling of the electric motor can be facilitated.

In the above fishing reel, it is preferable that a heat releasing member is disposed inside the opening portion so as to contact with the electric motor. Thus, cooling of the electric motor can be facilitated.

In the fishing reel of the present invention, the support unit increases the strength of supporting the handle shaft and the pinion gear shaft, and there is less possibility of relative displacement between the frame and the support unit. Therefore, a smooth rotation performance of the handle shaft and the pinion gear shaft can be maintained under a high load. Since there is less possibility of relative displacement between the frame and the support unit, it is possible to ensure the accuracy of the position to support the handle shaft and the pinion gear shaft. This feature also increases durability.

When at least part of the support unit is exposed through the side plate, the degree of freedom in design of the support unit and the side plate can be increased, facilitating the design of the shapes of the side plate and the support unit. It may also be easy to design the reel so as to facilitate heat release and improve the functionality. When the support unit is covered by the side plate, the degree of freedom in design of the side plate can be increased, facilitating the design of the shape of the side plate. Further, waterproofness of the support unit can be increased, and therefore, it is possible to stably maintain smooth rotation performance of the handle shaft and the pinion gear shaft for a long period.

When the support unit is capable of housing a plurality of brake plates included in the drag mechanism, the portions that may have a relatively high temperature during winding operation of the handle can be positioned together in the support unit. Therefore, the side plate can be prevented from heating. Thus, it may be easy to grip the reel body via the side plate. The fishing operability may be increased.

When the support unit is made of a metal and the side plate is made of a synthetic resin, it may be possible to increase the strength of the portions that are subjected to a load during winding operation, and reduce the weight. Thus, fishing operability can be increased. It may also be possible to ensure the accuracy of the positions to support the handle shaft and the pinion gear shaft with high precision. When the drag mechanism is housed in the support unit, the support unit is not deformed by overheating of the brake plates. Accordingly, there is less possibility of relative displacement between the frame and the support unit, and it is possible to stably maintain smooth rotation performance of the handle shaft and the pinion gear shaft for a long period.

Further, when an opening for releasing heat of an electric motor is formed in the side plate, cooling of the electric motor can be facilitated, and therefore, the durability of the electric motor can be increased Since cooling can be facilitated, a large electric motor (a high output electric motor) can be used.

Further, when a heat releasing member is disposed inside the opening portion so as to contact with the electric motor, cooling of the electric motor can be facilitated further, and therefore, the durability of the electric motor can be increased further.

BRIEF DESCRIPTION OF THE DRAWINGS

FIG. 4c is a sectional view of the support unit along the A-A line in FIG. 4a.

FIG. 6c is a sectional view of the right side plate along the B-B line in FIG. 5a.

DESCRIPTION OF EXAMPLE EMBODIMENTS

Embodiments of a fishing reel according to the present disclosure will be hereinafter described with reference to the drawings. The following description will be based on a case where the fishing reel is configured as an electric fishing reel, but this is not limitative. As used herein, "front-rear" and "left-right" directions refer to the directions shown in FIGS. 1 and 2, and a "top-bottom" direction refer to the direction shown in FIG. 2.

Figure 1:
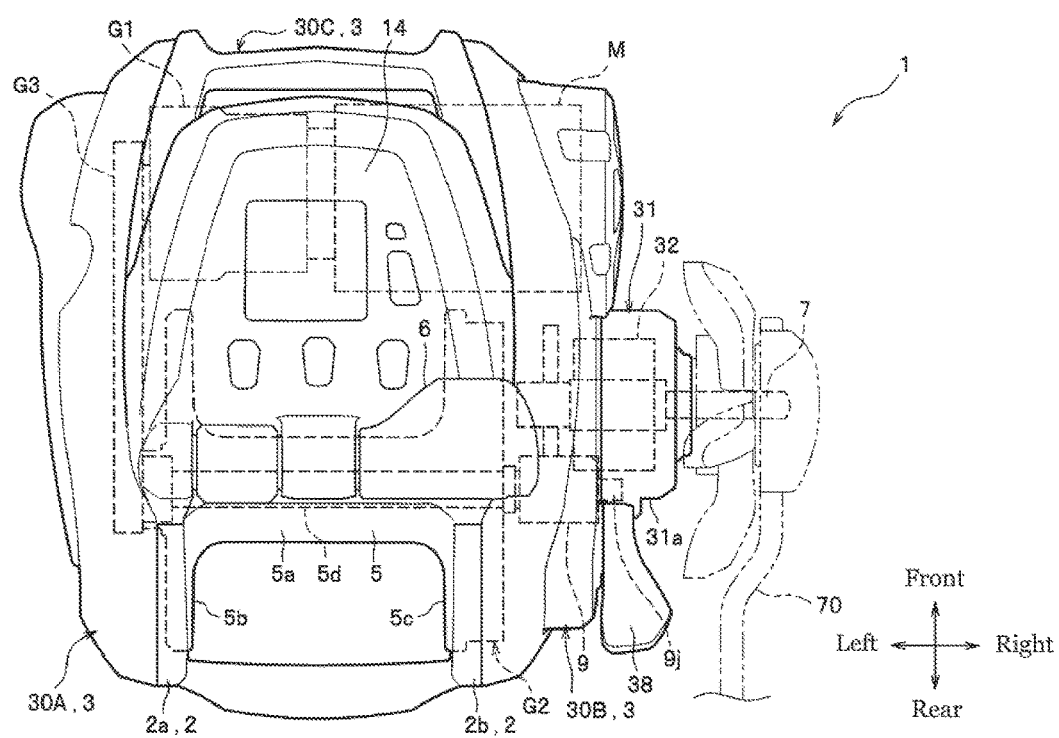
FIG. 1 is a plan view of an electric reel as a fishing reel according to an embodiment of the present invention (partially omitted).

As shown in FIG. 1, the fishing reel may include a reel body 1 having a frame 2 and side plates 3 disposed to cover the frame 2. The frame 2, which may constitute the framework of the reel body 1, may include a left frame 2a, a right frame 2b, and a front frame 2c disposed in front of the spool 5 (see FIG. 7). The left frame 2a, the right frame 2b, and the front frame 2c as a whole may be integrated together. The left frame 2a, the right frame 2b, and the front frame 2c may be formed separate from each other and integrated together by a fastener, or these frames may be formed so as to be partially integrated together.

The left and right frames 2a, 2b may be integrated together via a plurality of supporting columns (not shown). On a column positioned below (not shown), there may be provided a reel leg (not shown) to be mounted on a reel seat of a fishing rod. The frame 2 including the left frame 2a, the right frame 2b, and the front frame 2c may be formed of a metal material such as an aluminum alloy or a magnesium alloy. On the upper edges of the left and right frames 2a, 2b, there may be placed a counter casing 14.

Figure 7:
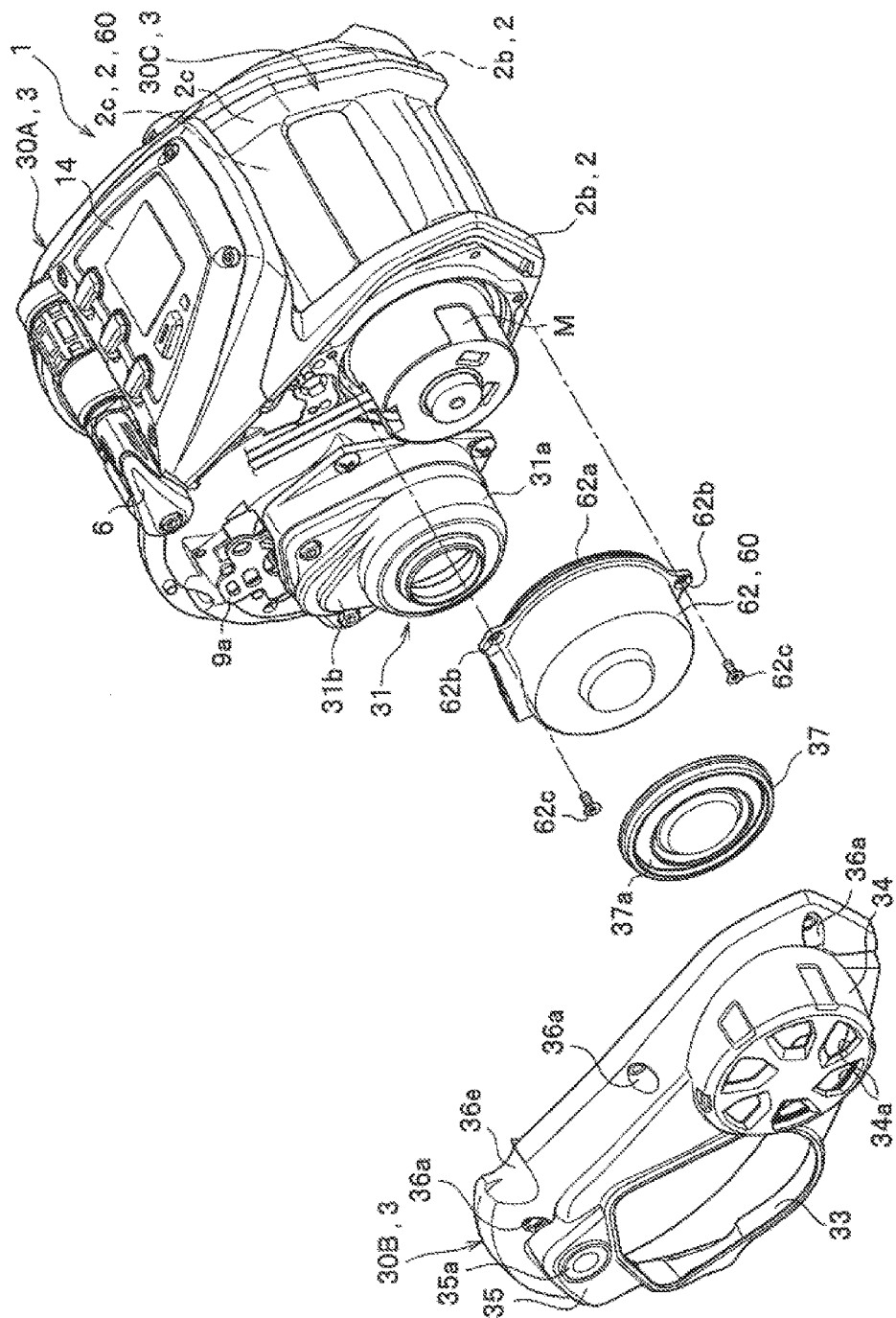
FIG. 7 is an exploded perspective view of the reel body from which a cover member, a heat releasing member, and the right side plate are removed.

The front frame 2c may have a substantially cylindrical shape having opening portions (not shown) for the left and right frames 2a, 2b, and the front frame 2c may house an electric motor M (see FIG. 7). The front frame 2c may serve as a part of a motor casing 60 (see FIG. 7) that may house the electric motor M (see FIG. 8).

The side plate 3 may include a left side plate 30A that may cover the left frame 2a, a right side plate 30B that may cover the right frame 2b, and a front side plate 30C that may cover the front frame 2c. The side plate 3 may constitute the portion to be gripped or held by an angler (the portion to be contacted by a hand of the angler). The left side plate 30A, the right side plate 30B, and the front side plate 30C may be individually formed of a synthetic resin as integral pieces and may be mounted on the left frame 2a, the right frame 2b, and the front frame 2c, respectively.

Further, a support unit 31 may be removably fixed on the right fame 2b. More specifically, the right frame 2b may be covered with two separate members (the right side plate 30B and the support unit 31). The support unit 31 may support a handle 70 for winding operation. The support unit 31 and the right side plate 30B will be described later.

As shown in FIG. 1, a spool 5 for winding a fishing line may be rotatably supported between the left and right frames 2a, 2b. The electric motor M may be disposed in front of the spool 5. The spool 5 may be rotationally driven in the direction of winding the fishing line by means of the winding operating of the handle 70 and the rotational drive of the drive motor M via a known reduction mechanism G1 constituting a drive force transmission mechanism.

The spool 5 may include a line winding barrel 5*a* around which the fishing line is to be wound. Both ends of the spool 5 may be flanges 5*b*, 5*c* for constraint of the fishing line being wound. The spool 5 may be rotatably supported on a spool shaft 5*d* via bearings (not shown) between the left and right frames 2*a*, 2*b*.

Figure 8:
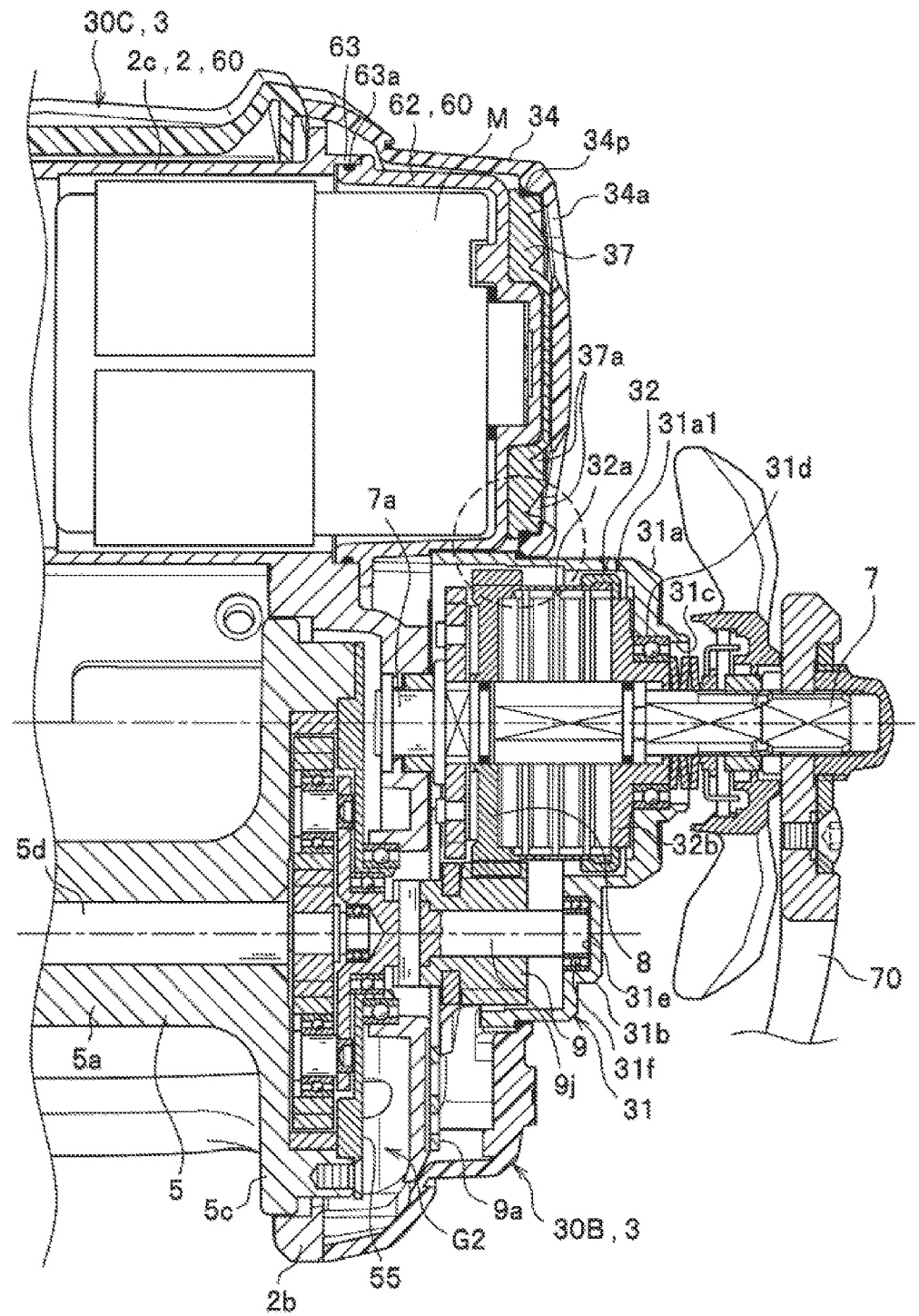
FIG. 8 is an enlarged sectional view along the C-C line in FIG. 5b.

The drive force may be transmitted to the spool 5 via the reduction mechanism G1 and a known reduction mechanism G2 provided on the right frame 2*b*. The reduction mechanism G1 may be provided on a lateral side of the electric motor M and may be configured to reduce the output of the electric motor M. The rotational drive force reduced by the reduction mechanism G1 may be transmitted to the spool shaft 5*d* via a known power transmission unit G3. The reduction mechanism G2 may be disposed on the right frame 2*b* side, and may be configured to reduce the rotational drive force of the spool shaft 5*d* and transmit it to the spool 5. As shown in FIG. 8, a pinion gear shaft 9*j* may be connected to the spool 5 via a bracket 55.

Next, the support unit 31 and the right side plate 30B that may cover the right frame 2*b* will now be described. The support unit 31 may be an integral piece made of a metal such as an aluminum alloy or a magnesium alloy. The support unit 31 may be disposed around the handle shaft 7 and fixed directly on the right frame 2*b*. The right side plate 30B may be disposed to encircle the support unit 31 and may be fixed directly on the right frame 2*b*. The support unit 31 may be mounted (projected) on a smaller area of the frame 2*b* than the right side plate 30B. The support unit 31 may be colored by the alumite treatment.

As shown in FIGS. 3*a*, 3*b*, 4*a*, and 4*b*, the support unit 31 may include a handle shaft support 31*a* having a bottomed cylindrical shape and a pinion gear shaft support 31*b* that may be continuous to the handle shaft support 31*a* and have a bottomed tubular shape. As shown in FIG. 4*c*, the handle shaft support 31*a* may contain a housing portion 31*a*1. As shown in FIG. 8, the housing portion 31*a*1 may contain a drive gear 8 and a drag mechanism 32 including a plurality of brake plates 32*a*.

As shown in FIG. 4*c*, an opening portion 31*c* having a circular cross section may be formed in the bottom portion of the handle shaft support 31*a*. The handle shaft 7 may be inserted through the opening portion 31*c*. As shown in FIG. 7, inside the opening portion 31*c*, a holder 32*b* of the drag mechanism 32 may be supported via a bearing member 31*d* that serves as a bearing. The holder 32*b* may have a disc-like shape and may be fitted around the handle shaft 7. Thus, the handle shaft support 31*a* that constitutes one end of the support unit 31 may support one end of the handle shaft 7 via the bearing member 31*d* and the holder 32*b*. The handle shaft 7 is connected frictionally with a drive gear 8 via a drag mechanism 32. The proximal end 7*a* of the handle shaft 7 may be rotatably supported by the right frame 2*b* in a known method so as not to come off. In addition, a known anti-reverse device may be provided to permit the handle shaft 7 to rotate in a forward direction for winding the fishing line and prevent the handle shaft 7 from rotating in a reverse direction reverse to the forward direction.

Figure 4A:
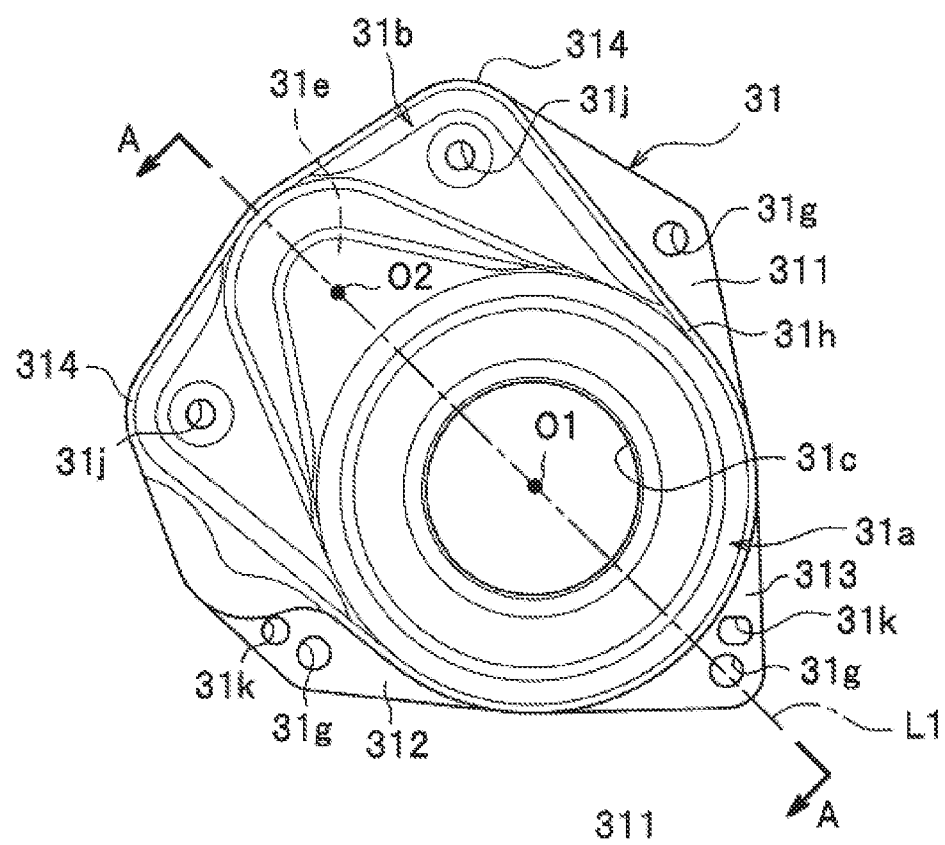
FIG. 4a is a side view of the support unit.

As shown in FIG. 4*a*, the pinion gear shaft support 31*b* may be continuous to the handle shaft support 31*a* and may extend in a skirt-like shape from the outer peripheral surface of the handle shaft support 31*a* to obliquely above the rear thereof. As shown in FIG. 8, a pinion gear 9 may be housed inside the pinion gear shaft support 31*b*. On a bottom portion 31*e* of the pinion gear shaft support 31*b*, a distal end of the pinion gear shaft 9*j* may be supported via a bearing member 31*f* serving as a bearing. The pinion gear shaft 9*j* may be connected to the spool 5. The pinion gear 9 may be in mesh with the drive gear 8.

As shown in FIG. 4*a*, on the outer peripheral surface of the support unit 31, there may be formed flanges 311, 312, and 313 for fixing that are arranged circumferentially in three positions around the opening portion 31*c* of the handle shaft support 31*a*. Each of the flanges 311, 312, and 313 may have a screw hole 31*g* formed therein. A fixing screw 31*m* may be inserted in each screw hole 31*g* and screwed into the right frame 2*b* (see FIGS. 3*a* and 3*b*). As shown in FIG. 4*a*, the screw hole 31*g* of the flange 311 disposed above and the screw hole 31*g* of the flange 312 disposed below may be positioned substantially symmetrically with respect to a virtual reference line L1 that may pass through the axis O1 of the handle shaft 7 (the center of the opening portion 31*c*) and the axis O2 of the pinion gear shaft 9*j*. The screw hole 31*g* of the flange 313 disposed in the front may be positioned (substantially) in an extension of the virtual reference line L1. Thus, the axis O1 of the handle shaft 7 may be positioned so as to be surrounded by the three fastening points by the fixing screws 31*m*. Therefore, the handle shaft 7 can be supported at an accurate position with respect to the right frame 2*b*. The flanges 311, 312, and 313 and the heads of the fixing screws 31*m* may be covered by the right side plate 30B when the right side plate 30B is mounted on the right frame 2*b*. In other words, these members may not be exposed in the right side surface of the reel body 1. This arrangement may improve the design.

As shown in FIG. 4*a*, the flanges 312, 313 may have positioning holes 31*k* that may serve as positioning portions used when the support unit 31 is mounted on the right frame 2*b*. In each of the positioning holes 31*k*, a positioning projection (not shown) that is projected from a mounting surface of the right frame 2*b* may be inserted.

The rear portion of the pinion gear shaft support 31*b* may have corners 314, 314. Each of the corners 314 may have a screw hole 31*j* formed therein. A fixing screw 31*n* may be inserted in each screw hole 31*j* and screwed into the right frame 2*b* (see FIGS. 3*a* and 3*b*). The screw hole 31*j* of the corner 314 disposed above and the screw hole 31*j* of the corner 314 disposed below may be positioned substantially symmetrically with respect to the virtual reference line L1. Thus, the axis O2 of the pinion gear shaft 9*j* may be positioned radially between the fixing screws 31*n*. Therefore, the pinion gear shaft 9*j* can be supported at an accurate position with respect to the right frame 2*b*.

Figure 4B:
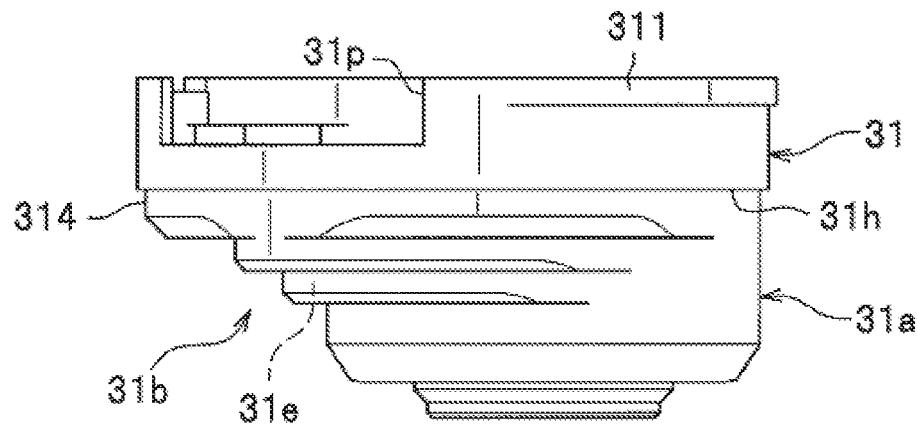
FIG. 4b is a plan view of the support unit.
Figure 9:
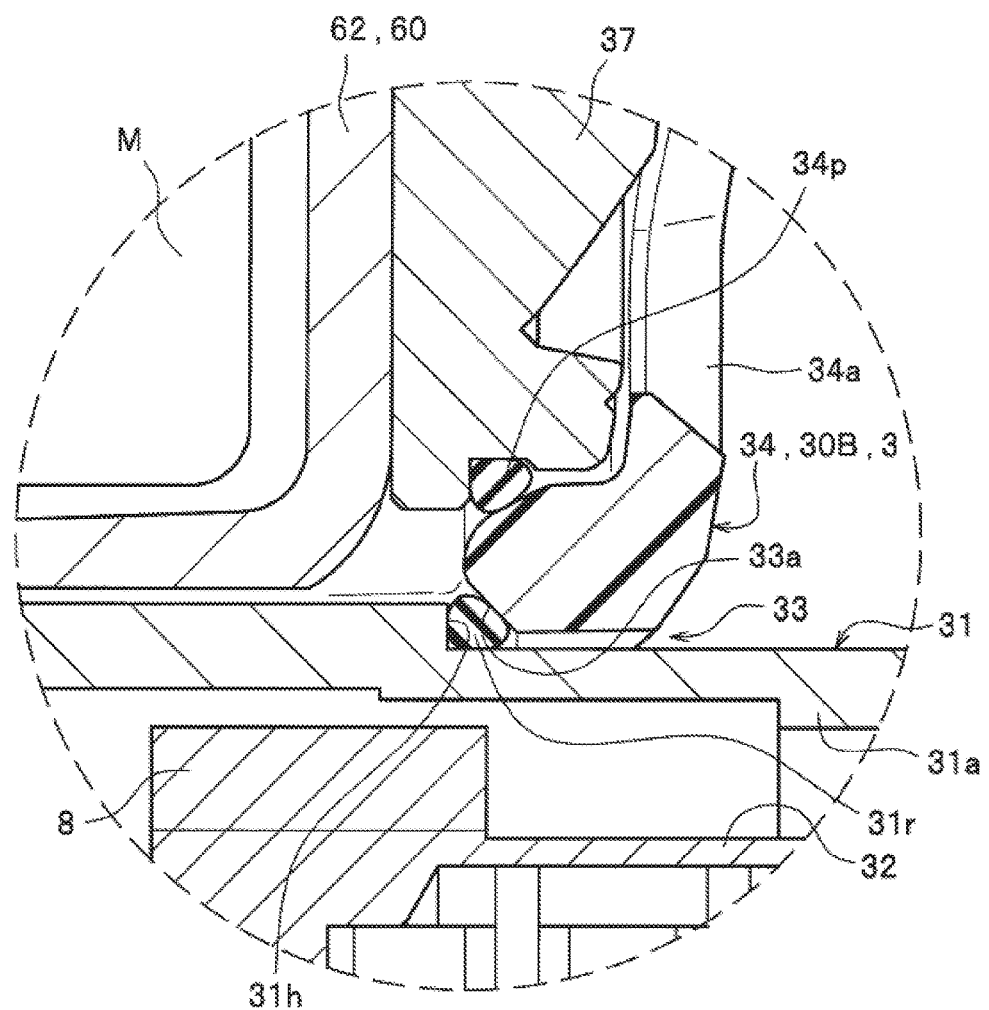
FIG. 9 is an enlarged sectional view illustrating sealing structure between an opening portion of the right side plate and the support unit.

As shown in FIGS. 4*a* to 4*c*, in the outer peripheral surface of the support unit 31, there may be formed a step surface 31*h* on a step extending in a circumferential direction. As shown in FIG. 9, on the outer peripheral surface of the support unit 31, there may be provided an O-ring 31*r* so as to contact with the step surface 31*h*. The O-ring 31*r* may be positioned between the step surface 31*h* and an edge 33*a* of the right side plate 30B that may be opposed to the step surface 31*h*. The edge 33*a* of the right side plate 30B may be chamfered. When the right side plate 30B is mounted on the right frame 2*b*, the O-ring 31*r* may be pressed and elastically deformed by the edge 33*a*, so as to be elastically urged against an angle (corner) formed between the step surface 31*h* and the outer peripheral surface of the handle shaft support 31*a*. Thus, the O-ring 31*r* may provide a water-tight seal between the support unit 31 and the opening portion 33 of the right side plate 30B.

Figure 5A:
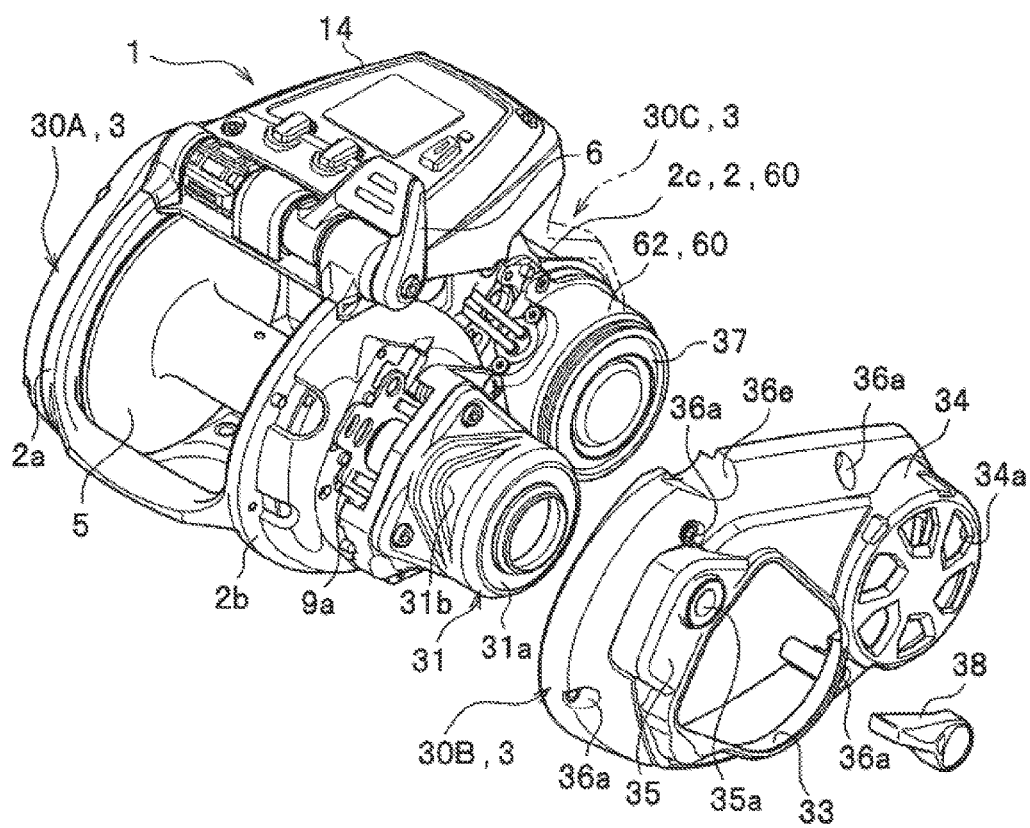
FIG. 5a is an exploded perspective view of the reel body in which a right side plate is removed from the right frame.
Figure 5B:
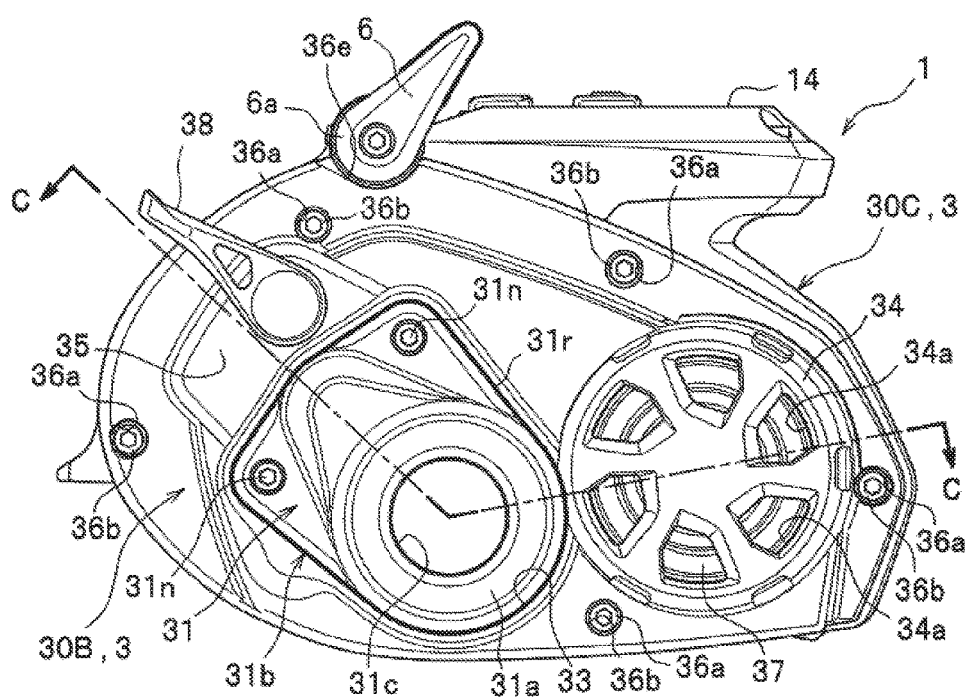
FIG. 5b is a side view of the reel body in which the right side plate is fixed on the right frame.

As shown in FIG. 5B, when the reel body 1 is viewed from the ride side, the O-ring 31r may be exposed to a gap between the opening portion 33 and the outer peripheral surface of the support unit 31. The size of the support unit 31 that may be inserted through the opening portion 33 may be set so as to maintain a slight gap between the outer peripheral surface of the support unit 31 and the opening portion 33. Thus, the O-ring 31r (having a black color for example) may be exposed between the opening 33 and the support unit 31, so as to provide accent that improves the design of the right side surface of the reel body 1.

Figure 3A:
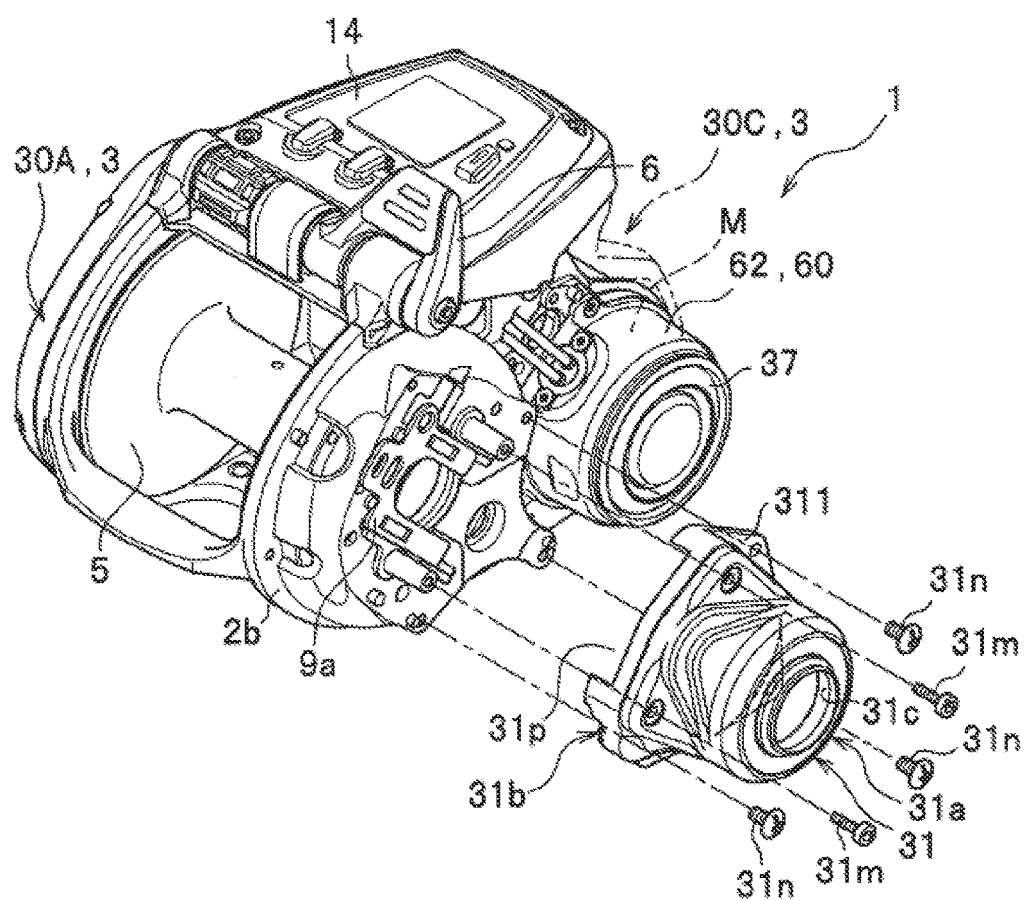
FIG. 3a is an exploded perspective view of a reel body in which a support unit is removed from a right frame.
Figure 3B:
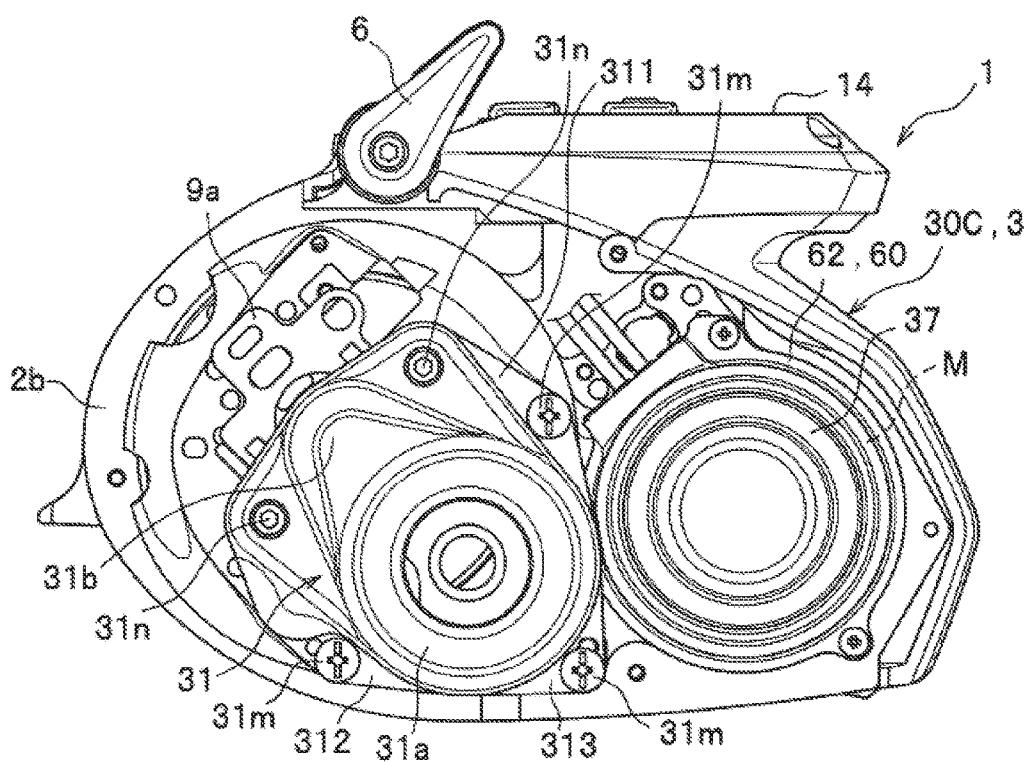
FIG. 3b is a side view of the reel body in which the support unit is fixed on the right frame.
Figure 4C:
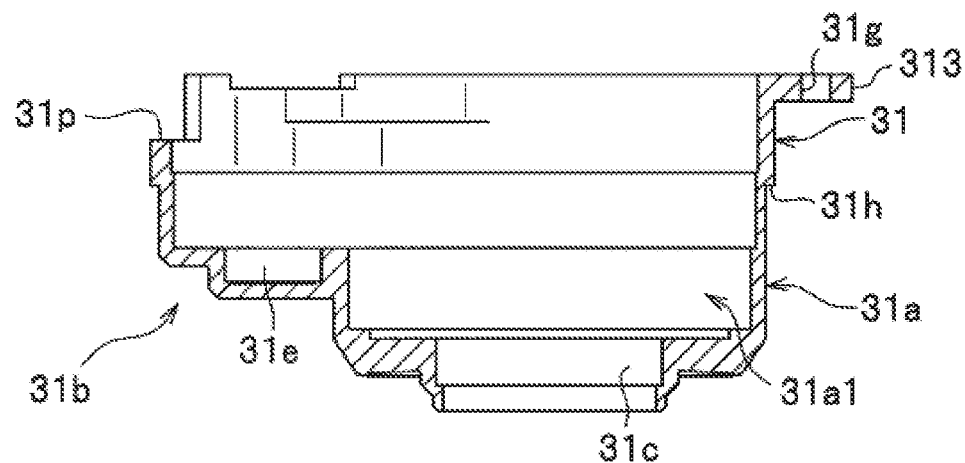

As shown in FIG. 8, a part of a slide plate 9a included in the known clutch mechanism may be housed inside the pinion gear shaft support 31b (see FIG. 3b). As shown in FIG. 4b, a pinion gear shaft support 31b may have an insertion hole 31p through which the slide plate 9a may be inserted.

The support unit 31, configured as described above, may be positioned with respect to the right frame 2b by engaging the positioning holes 31k with the positioning projections (not shown) of the right frame 2b. The fixing screws 31m may be inserted through the screw holes 31g of the flanges 311, 312, and 313 to fasten these flanges onto the right frame 2b. Further, the fixing screws 31n may be inserted through the screw holes 31j of the pinion gear shaft support 31b to fasten the pinion gear shaft support 31b. Thus, the support unit 31 may be fixed directly on the right frame 2b independently of the right side plate 30B.

Next, the right side plate 30B may be described. The right side plate 30B may be separate from the support unit 31 and may be independently fixed on the right frame 2b. The right side plate 30B may have the opening portion 33 formed therein. The opening portion 33 may have a shape conforming to that of the outer peripheral surface of the support unit 31. The handle shaft support 31a and the pinion gear shaft support 31b of the support unit 31 may project through the opening 33 so as to be exposed to the right side of the right side plate 30B (see FIGS. 2 and 8).

The right side plate 30B may have a support unit 35 formed on the upper rear edge of the opening portion 33. The support unit 35 may extend toward the right side. As shown in FIGS. 5a and 5b, the support unit 35 may have a substantially rectangular shape as viewed from the side. A support hole 35a (see FIG. 5a) may be formed in the support unit 35. On the support hole 35a, there may be mounted an operation lever 38 for operating the known clutch mechanism. The operation lever 38 can be rotationally operated in the front-rear direction via a spindle (not shown) inserted through the support hole 35a. When the operation lever 38 is rotationally operated, the slide plate 9a (see FIGS. 5a and 8) may be slid for engagement and disengagement (switching between on and off states) of the clutch mechanism.

Figure 2:
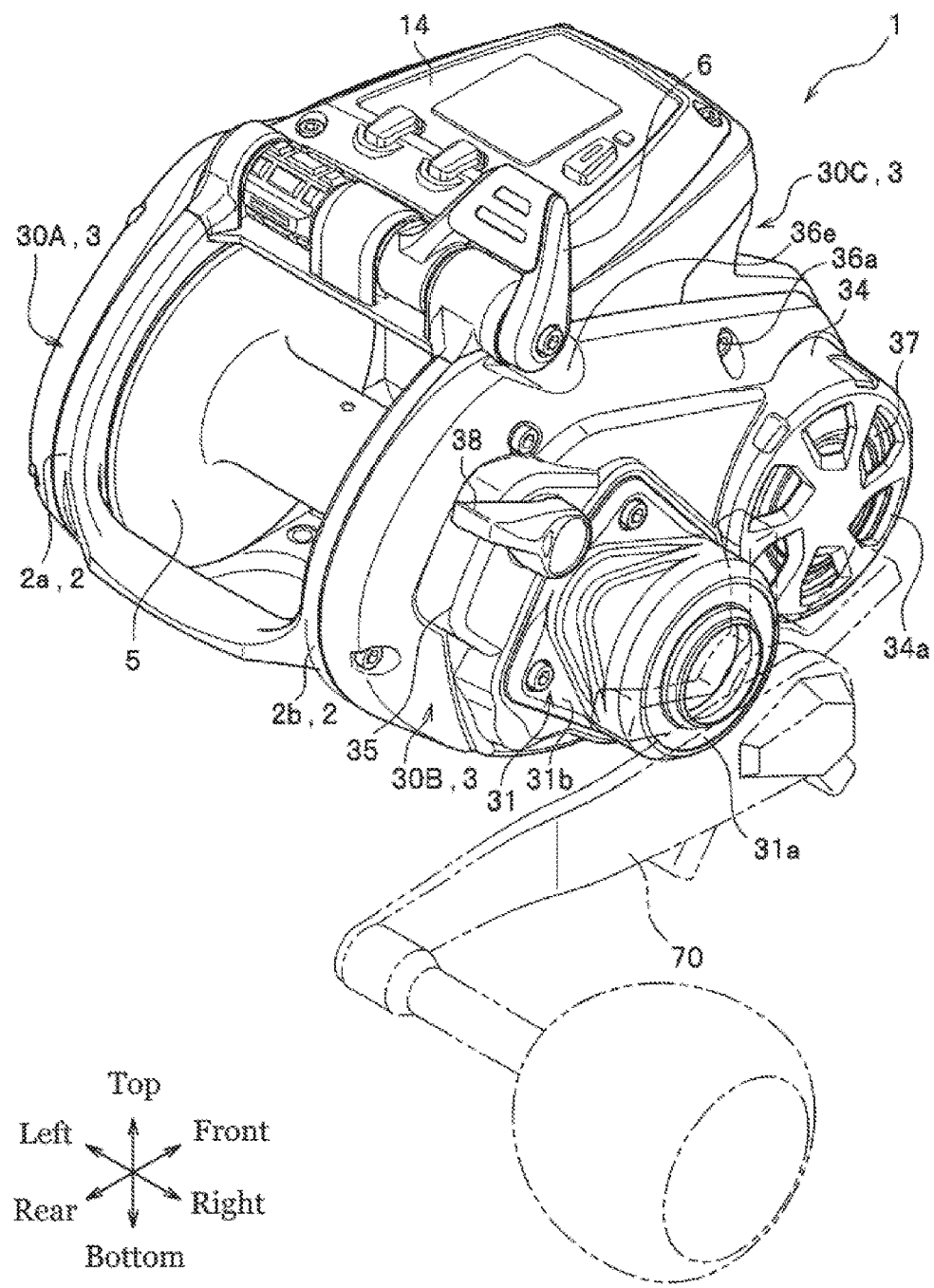
FIG. 2 is a perspective view of the same electric reel as viewed obliquely from above the right rear thereof.
Figure 6A:
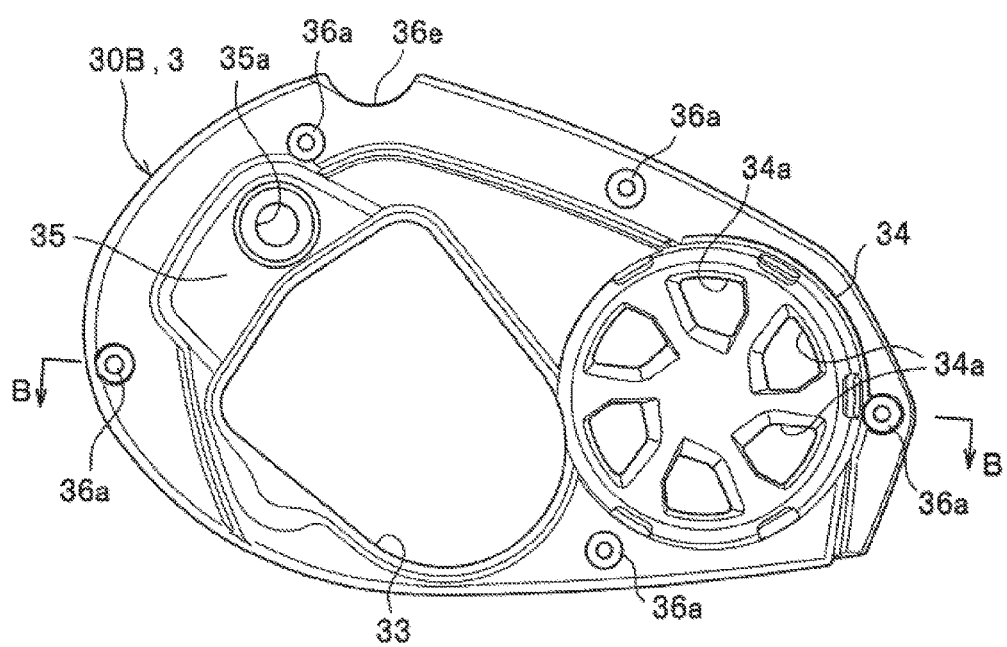
FIG. 6a is a side view of the right side plate.
Figure 6B:
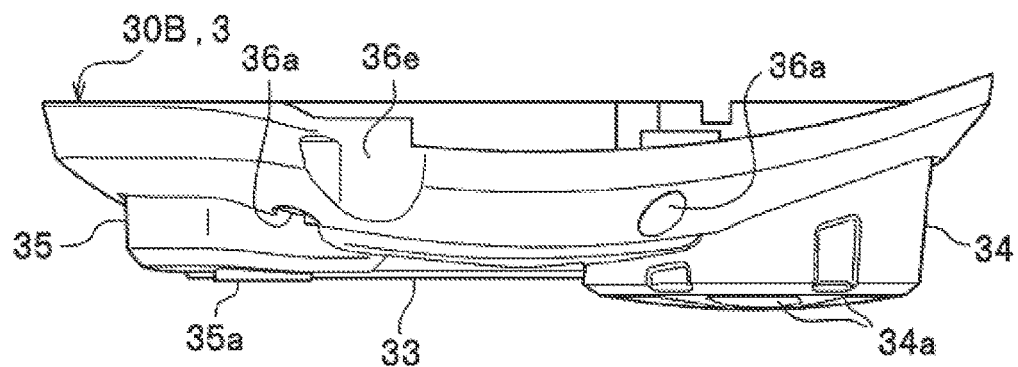
FIG. 6b is a plan view of the right side plate.
Figure 6C:
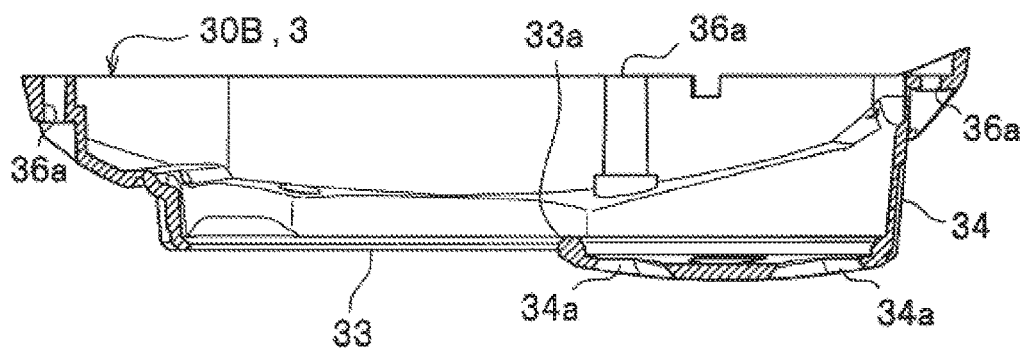

As shown in FIG. 5b, the right side plate 30B may have a motor cover 34 formed in the front portion thereof. The motor cover 34 may have a substantially circular shape as viewed from the side. As shown in FIGS. 6a to 6c, the motor cover 34 may have a bottomed cylindrical shape. In a right side wall of the motor cover 34 that form the bottom, there may be provided a plurality of opening portions 34a for releasing the heat of the electric motor M. As shown in FIGS. 2 and 5b, a heat releasing member 37 having a disc-like shape may be disposed inside the motor cover 34. The heat releasing member 37 may be formed of a metal material such as an aluminum alloy, a magnesium alloy, or a copper alloy. The heat releasing member 37 may be exposed through the opening portions 34a. As shown in FIGS. 8 and 9, the heat releasing member 37 may be tightly attached to the inner surface of the motor cover 34 via an O-ring 34p. As shown in FIG. 8, the left side surface of the heat releasing member 37 may be in contact with the cover member 62 that constitutes a part of the motor casing 60.

The electric motor M may be housed in the motor casing 60. The motor casing 60 may be constituted by the front frame 2c and the cover member 62 (see FIG. 7). The front frame 2c may have such an inner diameter that the electric motor M can be housed in the front frame 2c. The front frame 2c may be integrated with the left and right frames 2a, 2b. The cover member 62 may cover the right side portion of the electric motor M. The cover member 62 may have a bottomed cylindrical shape and, as shown in FIG. 8, may be fitted on the right edge portion 63 of the front frame 2c by spigot fitting via an O-ring 63a. As shown in FIG. 7, screws 62c may be inserted through screw holes 62b formed in a flange 62a on the edge of the opening, and the screws 6c may be screwed into the right frame 2b, so as to fix the cover member 62 on the right frame 2b. The heat from the electric motor M may be transmitted to the heat releasing member 37 via the cover member 62, and may be released into the outside air through the opening portion 34a.

As shown in FIG. 5a, the right side plate 30B may have an arc-like recess 36e formed in the upper end portion thereof. As shown in FIG. 5b, there may be disposed, in the recess 36e, an end portion 6a of an operation lever 6 to be rotationally operated in the front-rear direction for adjusting the output of the electric motor M.

As shown in FIG. 5B, fixing screws 36b may be inserted through screw holes 36a formed in peripheral portions of the right side plate 30B at intervals, and the screws 36b may be screwed into the right frame 2b, so as to fix the right side plate 30B on the right frame 2b.

In the fishing reel of the embodiment as described above, the support unit 31 may increase the strength of supporting the handle shaft 7 and the pinion gear shaft 9j, and there is less possibility of relative displacement between the right frame 2b and the support unit 31. Therefore, a smooth rotation performance of the handle shaft 7 and the pinion gear shaft 9j can be maintained under a high load. This feature may increase durability. Since the support unit 31 is fixed directly on the right frame 2b, the handle shaft 7 and the pinion gear shaft 9j can be supported accurately. Therefore, it may be facilitated to manage the accuracy of the positions to support the handle shaft 7 and the pinion gear shaft 9j. This feature may increase the quality of the fishing reel and facilitate the built-in work and production of the fishing reel.

In addition, the right side plate 30B may not need to have a shape or structure for supporting the handle shaft 7 and the pinion gear shaft 9j, and therefore, the degree of freedom in structure and design of the right side plate 30B can be increased. It may also be easy to design the right side plate 30B so as to facilitate heat release from the support unit 31 and improve the functionality.

Further, since the support unit 31 is exposed through the right side plate 30B, the degree of freedom in design of the support unit 31 and the side plate 30B can be increased. Thus, it may be facilitated to design the shapes of the right side plate 30B and the support unit 31. Still further, when the drag mechanism 32 is provided on the handle shaft 7 as in this embodiment, it may also be easy to design the reel so as to facilitate heat release and improve the functionality.

The support unit 31 may include the plurality of brake plates 32a included in the drag mechanism 32 and the housing portion 31a1 that houses the drive gear 8, and the portions that may have a relatively high temperature during winding operation of the handle 70 may be positioned together in the support unit 31. Therefore, the right side plate 30B can be suitably prevented from heating. Thus, it may be possible to suitably grip the reel body 1 via the right side plate 30B. The fishing operability may be increased.

Since the support unit 31 is made of a metal and the right side plate 30B is made of a synthetic resin, it may be possible to increase the strength of the portions that are subjected to a load during winding operation, and reduce the weight. Thus, fishing operability can be increased. The support unit 31 made of a metal may ensure the accuracy of the positions to support the handle shaft 7 and the pinion gear shaft 9j with high precision. Since the support unit 31 is made of a metal, the support unit 31 may not be deformed by heat even if the brake plates 32a of the drag mechanism 32 are overheated during fishing. Accordingly, there is less possibility of relative displacement between the right frame 2b and the support unit 31, and it is possible to stably maintain smooth rotation performance of the handle shaft 7 and the pinion gear shaft 9j for a long period.

The right side plate 30B may be separate from the support unit 31, and therefore, a high temperature in the support unit 31 may not be directly transmitted to the right side plate 30B. The right side plate 30B, which may be made of a synthetic resin, can be prevented from being deformed. If the right side plate 30B is damaged as it is dropped for example, the right side plate 30B can be replaced as a single part. Accordingly, maintenance is facilitated and the cost of replacing parts is low.

Further, cooling of the electric motor M can be facilitated through the opening portion 34a of the right side plate 30B, and therefore, the durability of the electric motor M can be increased Since cooling of the electric motor M can be facilitated, a large electric motor (a high output electric motor) can be used.

The heat releasing member 37 may be disposed inside the opening portion 34a of the right side plate 30B so as to contact with the electric motor M and may be exposed through the opening portion 34a, and therefore, cooling of the electric motor M can be facilitated further. Accordingly, the durability of the electric motor M can be increased further.

Embodiments of the present invention are not limited to the above descriptions and are susceptible to various modifications. For example, the above embodiments are configured such that the support unit 31 is projected laterally through the opening portion 33 of the right side plate 30B, but this feature is not limitative. It may also be possible that the support unit 31 is not exposed and the entirety or substantial entirety of the support unit 31 is laterally covered by the right side plate 30B. This arrangement may increase the degree of freedom in structure and design of the right side plate 30B. Further, waterproofness of the support unit 31 can be increased, and therefore, it is possible to stably maintain smooth rotation performance of the handle shaft 7 and the pinion gear shaft 9j for a long period. In addition, finishing of the support unit 31 is no longer necessary, and the cost can be reduced.

It may also be possible that the right side plate 30B, which may be constituted by a single member in the above embodiments, is constituted by two or more members. This arrangement may increase the degree of freedom in structure and design of the right side plate 30B.

It may also be possible that the support unit 31, which may be made of a metal in the above embodiments, is made of a synthetic resin. In this arrangement, there is less possibility of relative displacement between the right frame 2b and the support unit 31 because the support unit 31 is fixed directly on the right frame 2b, and it is possible to stably maintain smooth rotation performance of the handle shaft 7 and the pinion gear shaft 9j. In addition, the weight of the support unit 31 can be reduced. Further, the support unit 31 may be made of a synthetic resin or a fiber-reinforced resin with a reinforcement metal member made by insert molding.

The right side plate 30B may not necessarily have the opening portion 34a formed therein. When the right side plate 30B has the opening portion 34a formed therein, it may also be possible that the heat releasing member 37 is not provided and the cover member 62 of the motor casing 60 is exposed through the opening portion 34a.

Further, it may also be possible that the pinion gear shaft support of the support unit 31 is extended to support the operation lever 38 for switching the clutch mechanism. This arrangement may increase the strength of supporting the operation lever 38, resulting in improved operability.

In the above embodiments, the pinion gear shaft 9j is described as a shaft member connected to the spool 5 and inserted through the pinion gear 9, but this is not limitative. It may also be possible that the pinion gear shaft 9j is either an extended end portion of the spool shaft Sd inserted through the pinion gear 9 or a cylindrical extended end portion of the pinion gear 9 itself, as is known publicly.

What is claimed is:

1. A fishing reel comprising:
a reel body having left and right frames;
a handle shaft rotatably provided on one of the left and right frames;
a drive gear provided on the handle shaft;
a spool configured to be rotationally driven via a pinion gear meshing with the drive gear;
a side plate fixed on the one of the left and right frames by fixing screws inserted through screw holes formed in peripheral portions of the side plate; and
a support unit separate from the side plate,
wherein the support unit includes a handle shaft support and a pinion gear shaft support, the handle shaft support supporting the handle shaft, and the pinion gear shaft support supporting a pinion gear shaft of the pinion gear, and
wherein the support unit is removably fixed on the one of the left and right frames.

2. The fishing reel of claim 1, wherein at least part of the support unit is exposed through the side plate.

3. The fishing reel of claim 1, wherein an entirety of the support unit is covered by the side plate.

4. The fishing reel of claim 1, wherein the support unit houses a plurality of brake plates included in a drag mechanism for frictional connection between the handle shaft and the drive gear rotatably provided on the handle shaft.

5. The fishing reel of claim 1, wherein the support unit is made of a metal, and the side plate is made of a synthetic resin.

6. The fishing reel of claim 1, wherein the reel body includes an electric motor configured to rotationally drive the spool, and wherein the side plate has an opening portion for releasing heat of the electric motor.

7. The fishing reel of claim 6, further comprising a heat releasing member disposed inside the opening portion so as to contact with the electric motor.

* * * * *